(12) United States Patent
Dresow

(10) Patent No.: US 11,933,457 B2
(45) Date of Patent: Mar. 19, 2024

(54) ONE-PIECE NECK TUBE

(71) Applicant: MVE Biological Solutions US, LLC, Brentwood, TN (US)

(72) Inventor: Jeffry S. Dresow, New Prague, MN (US)

(73) Assignee: MVE Biological Solutions US, LLC, Brentwood, TN (US)

( * ) Notice: Subject to any disclaimer, the term of this patent is extended or adjusted under 35 U.S.C. 154(b) by 14 days.

(21) Appl. No.: 17/739,734

(22) Filed: May 9, 2022

(65) Prior Publication Data
US 2023/0358364 A1  Nov. 9, 2023

(51) Int. Cl.
F17C 3/08  (2006.01)

(52) U.S. Cl.
CPC ........ *F17C 3/08* (2013.01); *F17C 2203/0391* (2013.01); *F17C 2203/0646* (2013.01); *F17C 2203/0673* (2013.01); *F17C 2205/0352* (2013.01); *F17C 2221/014* (2013.01); *F17C 2223/0161* (2013.01); *F17C 2260/036* (2013.01)

(58) Field of Classification Search
CPC ................ F17C 3/08; F17C 2203/0391; F17C 2203/0646; F17C 2203/0673; F17C 2205/0352; F17C 2221/014; F17C 2223/0161; F17C 2260/036; F17C 2203/0629

See application file for complete search history.

(56) References Cited

U.S. PATENT DOCUMENTS

| 803,636 | A | * | 11/1905 | Stein | A01J 9/00 |
| | | | | | 220/560.04 |
| 4,154,363 | A | * | 5/1979 | Barthel | B32B 1/02 |
| | | | | | 220/560.12 |
| 6,029,456 | A | * | 2/2000 | Zaiser | F17C 13/002 |
| | | | | | 62/51.1 |
| 6,119,465 | A | | 9/2000 | Mullens et al. | |
| 11,686,434 | B1 | * | 6/2023 | Li | F17C 5/007 |
| | | | | | 141/1 |

(Continued)

FOREIGN PATENT DOCUMENTS

| CN | 204568379 U | 8/2015 |
| CN | 207595699 U | 7/2018 |
| JP | 2020130911 A | 8/2020 |

OTHER PUBLICATIONS

PCT; International Search Report and Written Opinion dated Aug. 29, 2023 for Application No. PCT/US2023/020863.

*Primary Examiner* — Shawn M Braden
(74) *Attorney, Agent, or Firm* — Snell & Wilmer L.L.P.

(57) ABSTRACT

A dewar for storing a cryogenic fluid includes an inner vessel, an outer vessel, and a one-piece neck tube. The outer vessel includes an outer upper jacket and an outer lower jacket configured to be joined and define an interior chamber. The inner vessel is positioned within the interior chamber so that an insulation space is defined. The insulation space is at least partially evacuated of air. The one-piece neck tube extends between the inner vessel and the central region of the outer upper jacket. The one-piece neck tube includes a first portion configured to couple with the outer upper jacket, and a second portion configured to couple with the inner vessel such that the second portion extends into the inner vessel. The second portion is integrally formed with the first portion as one-piece.

17 Claims, 4 Drawing Sheets

(56) References Cited

U.S. PATENT DOCUMENTS

2002/0166326 A1\* 11/2002 Giesy ................. F17C 13/06
62/48.1
2012/0211498 A1 8/2012 Cognard \* cited by examiner

ONE-PIECE NECK TUBE

FIELD OF THE INVENTION

The present disclosure relates generally to cryogenic fluid containers and, in particular, to a dewar featuring a one-piece neck tube and retainer construction.

BACKGROUND

Containers called dewars are used for storage and transport of cryogenic materials at very low temperatures (e.g., liquid nitrogen boils at 77K or −196 C at normal pressure). They are necessarily constructed with minimal thermal connections, including an evacuated space, between an outer vessel and inner vessel that contains the cryogenic materials (often liquid nitrogen, also called LN2, and some valuable items or matter that must be kept cold by the LN2 as it evaporates from the minor heat leak into the inner vessel from the outside world). The space between the vessels is evacuated to eliminate convective heat transport.

The only unavoidable connection between inner and outer vessels in a dewar is a neck opening to allow filling and emptying of the inner vessel from the outside world. Preferably, these necks, constructed of laminated fiberglass/epoxy, are the only such connection, such that the inner vessel and all its contents are suspended exclusively through that neck attached to the outside vessel's top region.

The cryogenic vapor shipper is used for transport and typically includes a cylindrical, perforated retainer made of either aluminum or stainless steel which creates a barrier between the liquid nitrogen absorbent and the payload area of the dewar inner vessel which contains the biological material. The retainer allows access to the biological material in the payload area of the dewar. The perforations are required to charge the absorbent with liquid nitrogen prior to shipment of the biological material. The liquid nitrogen absorbent prevents spillage in the case of accidental tip over of the dewar.

Accordingly, the two components of the existing two-part neck tube and absorbent retainer must be aligned concentrically to allow for insertion and removal of the biological material stored in the payload area of the vapor shipper. If misaligned, either from the factory, or from a significant blow during handling and shipping, it is difficult to insert and retrieve the biological material, and could possibly damage the packaging, and thus the viability, of the biological material in extreme misalignment occurrences. The two-part design also requires extra labor and cost to procure the two parts and assemble the two parts into the cryogenic vapor shipper. When the cryogenic vapor shipper is in the upright condition, the vapor shipper reaches thermal equilibrium and operates optimally. In the reality of the shipping industry, not all vapor shipper dewars ship in the upright condition, with any out-of-position orientation leading to a reduced holding time for the dewar, potentially compromising the biological material in the dewar.

SUMMARY

Figure 1B:
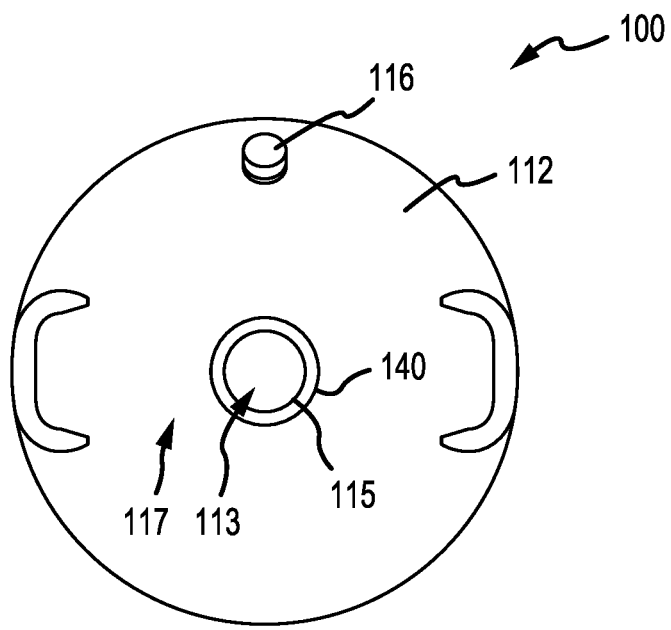
FIG. 1B is a top view of a dewar, according to an example embodiment.

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto. In one aspect, a dewar for storing a cryogenic fluid includes an inner vessel configured to store the cryogenic fluid, an outer vessel, and a one-piece neck tube. The outer vessel includes an outer upper jacket and an outer lower jacket configured to be joined and define an interior chamber. The outer upper jacket includes a central region and a collar. The inner vessel is positioned within the interior chamber so that an insulation space is defined between the inner and outer vessels. The insulation space is at least partially evacuated of air. The one-piece neck tube extends between the inner vessel and the central region of the outer upper jacket. The one-piece neck tube includes a first portion configured to couple with the outer upper jacket, the first portion having a first outer diameter, and a second portion configured to couple with the inner vessel such that the second portion extends into the inner vessel, the second portion having a second outer diameter. The second portion is integrally formed with the first portion as one-piece.

In another aspect, a one-piece neck tube of a dewar for storing a cryogenic fluid includes a first portion configured to couple with an outer vessel of a dewar, the first portion having a first outer diameter, and a second portion configured to couple with an inner vessel of a dewar, the second portion having a second outer diameter equal to the first outer diameter. The first portion and the second portion are portions of a same piece of glass-fiber reinforced material.

In another aspect, an outer vessel for a dewar for storing a cryogenic fluid includes an outer upper jacket, an outer lower jacket configured to be joined with the outer upper jacket, a one-piece neck tube, and a collar. The outer upper jacket and the outer lower jacket together define an interior chamber. The one-piece neck tube is adapted to attach to an inner vessel disposed within the interior chamber of the dewar. The one-piece neck tube includes a first portion coupled with the outer upper jacket, and a second portion configured to couple with the inner vessel. The collar is configured to secure the one-piece neck tube to the outer upper jacket.

In another aspect, a method of assembly of a dewar for storing a cryogenic fluid includes, coupling an inner upper jacket with an inner lower jacket such that an inner vessel is formed, the inner vessel configured to store a biological material, coupling a one-piece neck tube with the inner upper jacket, positioning the inner vessel within an outer lower jacket, coupling the one-piece neck tube with an outer upper jacket, and coupling the outer upper jacket with the outer lower jacket such that an outer vessel is formed. The outer vessel is configured to contain the inner vessel. The inner vessel and the outer vessel are coupled only by the one-piece neck tube.

DETAILED DESCRIPTION

A description of example embodiments of the invention follows.

Figure 1A:
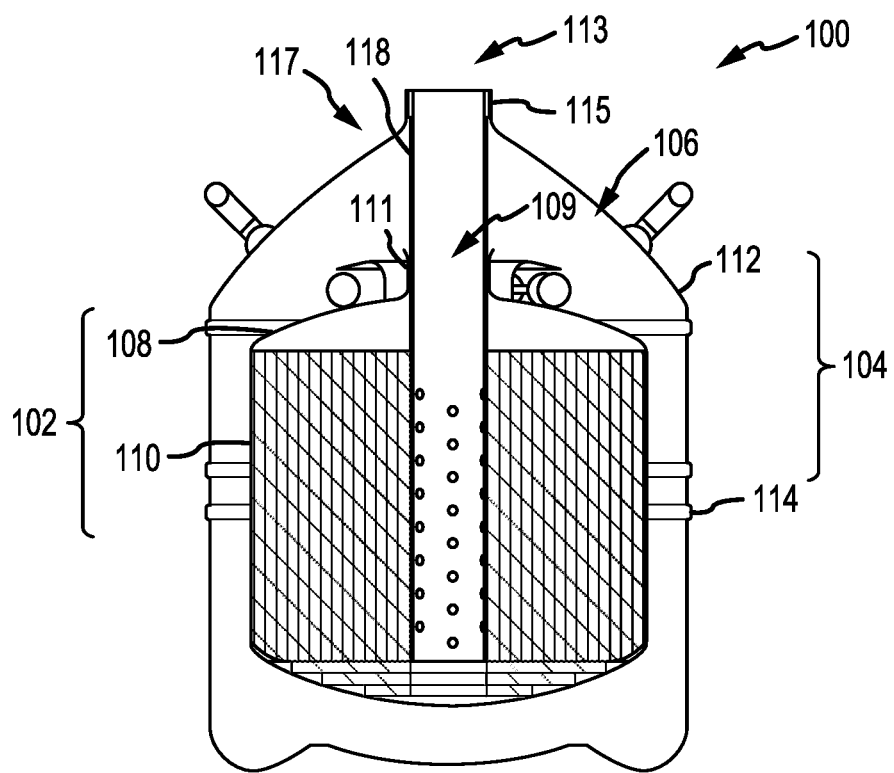
FIG. 1A is a cross sectional side view of a dewar, accordingly to an exemplary embodiment.
Figure 2A:
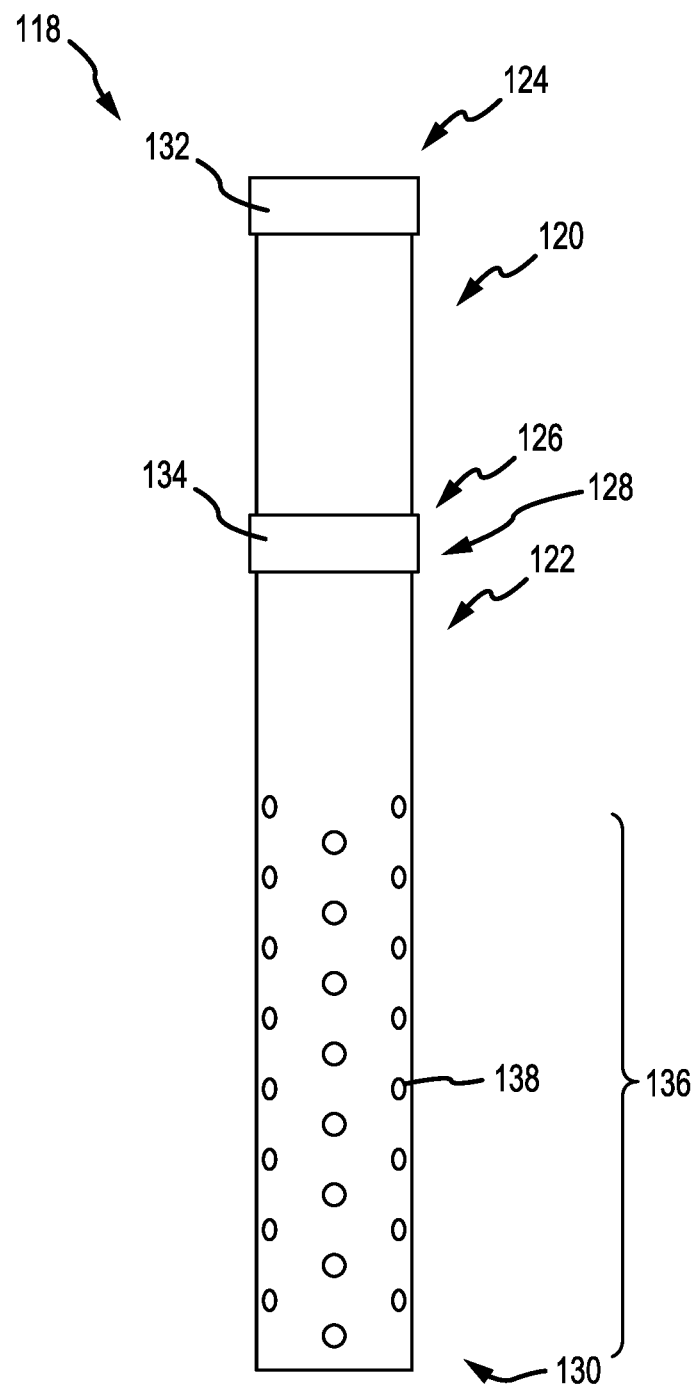
FIG. 2A is a schematic of a one-piece neck tube of the dewar of FIG. 1, according to an example embodiment.
Figure 2B:
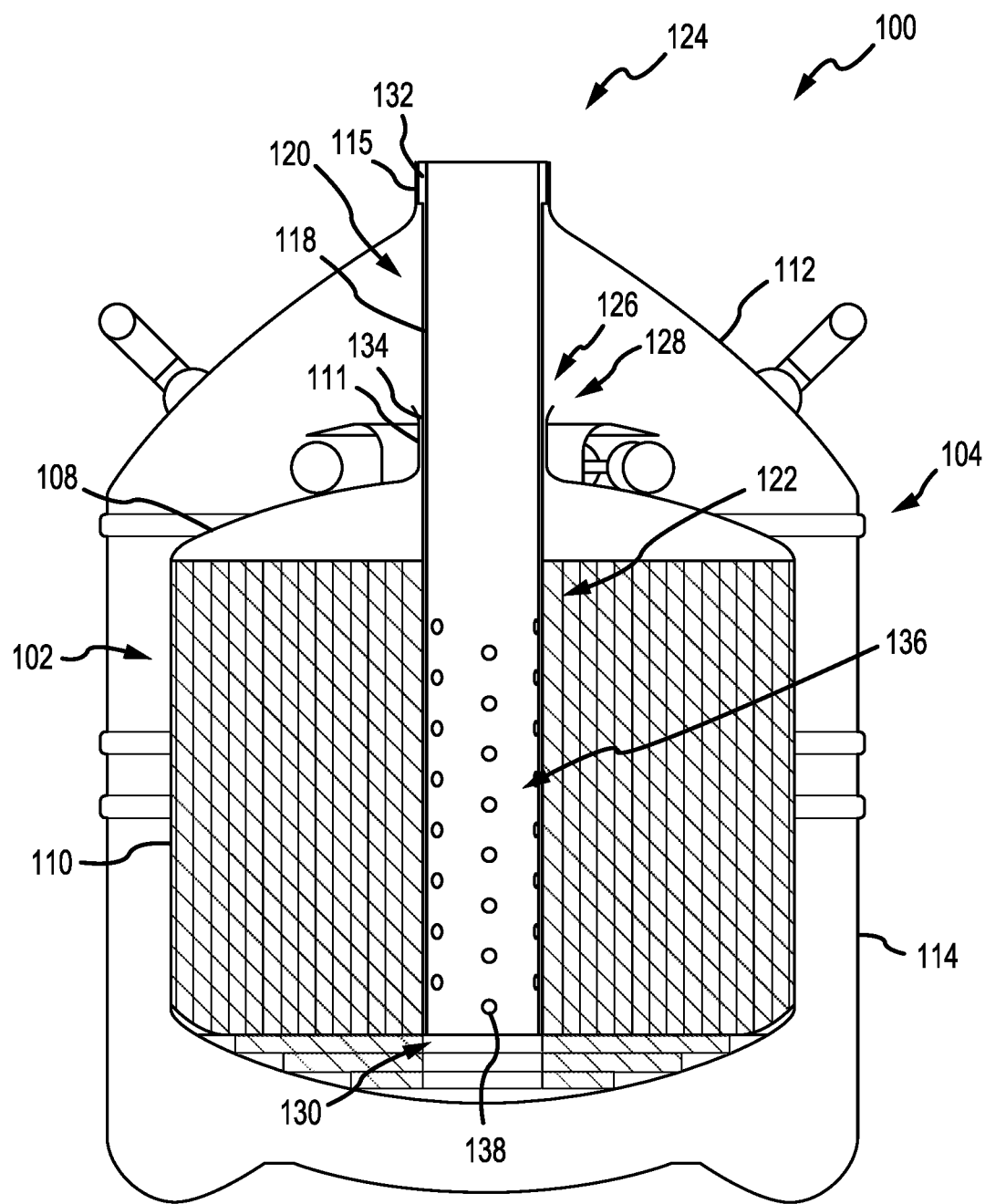
FIG. 2B is a cross sectional side view of the dewar of FIG. 1 illustrating a relationship between the dewar and the one-piece neck tube of FIG. 2A, according to an example embodiment.
Figure 3A:
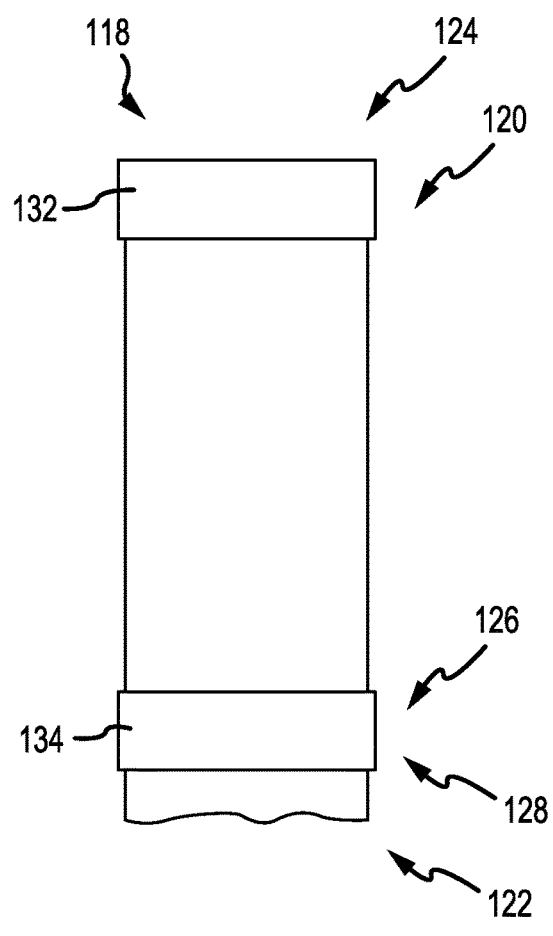
FIG. 3A is a detailed view of section A of FIG. 2, according to an example embodiment.
Figure 3B:
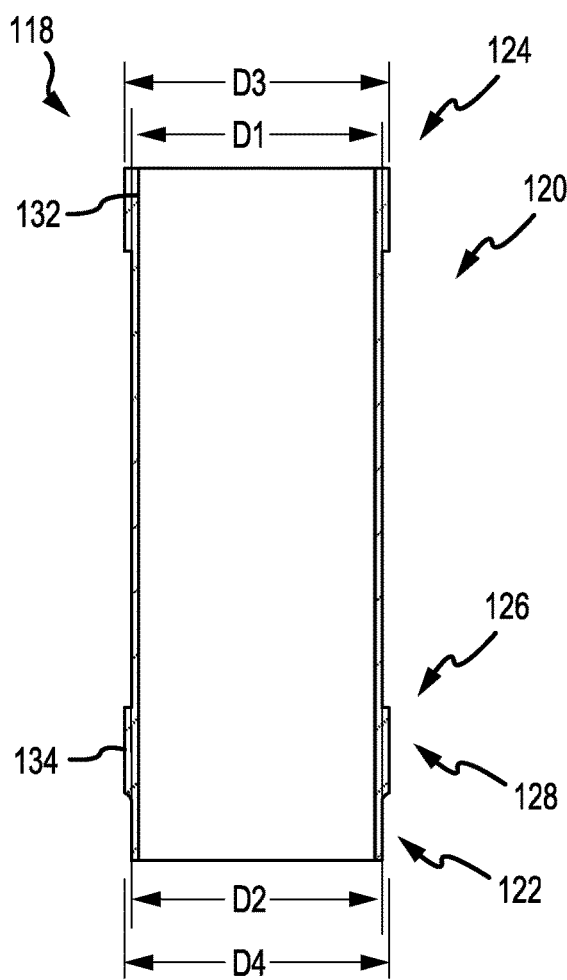
FIG. 3B is a cross-sectional view of section A of FIG. 2, according to an example embodiment.

Referring to FIGS. 1A and 1B, a dewar 100 is illustrated in accordance with an exemplary embodiment described here. The dewar 100 includes an inner vessel 102 positioned within an outer vessel 104 with an insulation space 106 formed between.

The inner vessel 102 includes an inner upper jacket 108 and an inner lower jacket 110. The inner upper jacket 108 and the inner lower jacket 110 may be welded together to form the inner vessel 102. The inner upper jacket 108 include and an opening 109. The opening 109 may be disposed in a center position of the inner upper jacket 108. The opening 109 may be circular such that the opening 109 is configured to receive a one-piece neck tube, as described herein. The opening 109 further includes a flange 111. The flange 111 may extend axially from the opening 109 along the circumference of the opening 109 such that the flange 111 forms a cylindrical inlet. The inner upper jacket 108 may be configured in a generally arcuate shape such that the inner upper jacket 108 extends from the opening 109 to the inner lower jacket 110 in a first downward slope. Thus, the inner upper jacket 108 may have a generally arcuate cross section so that the inner upper jacket is a dome. The inner lower jacket 100 may be generally cylindrical.

Similarly, the outer vessel 104 includes an outer upper jacket 112 and an outer lower jacket 114. The outer upper jacket 112 and the outer lower jacket 114 may be welded together to form the outer vessel 104. The inner upper jacket 108, the inner lower jacket 110, the outer upper jacket 112, and the outer lower jacket 114 may be constructed from a flat aluminum alloy. The outer upper jacket 112 may include an opening 113. The opening 113 may be disposed in a center position along a central region 117 of the outer upper jacket 112. The opening 113 may be circular such that the opening 113 is configured to receive a one-piece neck tube, as described herein. For instance, the opening 113 receives the same one-piece neck tube received by the opening 109 of the inner upper jacket 108. The opening 113 further includes a flange 115. The flange 115 may extend axially from the opening 113 along the circumference of the opening 113 such that the flange 115 forms a cylindrical inlet. The outer upper jacket 112 may be configured in a generally arcuate shape such that the outer upper jacket 112 extends from the opening 113 to the outer lower jacket 114 in a second downward slope. The second downward slope may be greater than the first downward slope. The outer lower jacket 114 may be generally cylindrical.

The inner vessel 102, configured to store the biological material, is assembled and welded. The inner vessel 102 may be wrapped with multi-layer radiant-reflective material and inserted into a partly complete outer vessel 104 (e.g., positioned within the outer lower jacket 114). The outer lower jacket 114 may then receive the outer upper jacket 112, which is welded on, so that an interior chamber containing the inner vessel 102 is formed, comprising the insulation space 106 between the inner vessel 102 and the outer vessel 104.

The dewar 100 may further include a valve 116. The valve 116 may be disposed on an outer surface (e.g., opposite the inner chamber) of the outer upper jacket 112. The valve 116 may be configured to couple with a vacuum (not shown). Accordingly, the valve is configured to evacuate the air in the insulation space 106, providing a vacuum insulation within the dewar 100.

The dewar 100 includes a one-piece neck tube 118. The one-piece neck tube 118 comprises a single tube component. The one-piece neck tube is a one-piece dewar neck tube with an integrated retainer, thus preventing cold nitrogen gas from fully escaping the dewar if the dewar is inverted, for example. The one-piece neck tube 118 is configured to extend between the inner vessel 102 and the outer vessel 104. Particularly, the one-piece neck tube 118 extends from the inner lower jacket 110 through to the outer upper jacket 112. The one-piece neck tube 118 is configured to be received by the opening 109 of the inner vessel 102 and the opening 113 of the outer vessel 104. For instance, the one-piece neck tube 118 may be attached to and protruding from the inner upper jacket 108 and extending to the outer upper jacket 112. The one-piece neck tube 118 attaches the inner upper jacket 108 to the outer upper jacket 112. In various embodiments, the one-piece neck tube 118 is the only attachment between the inner upper jacket 108 and outer upper jacket 112. In various embodiments, the one-piece neck tube 118 attaches the inner upper jacket 108 and the outer upper jacket 112 and no other structures attach the inner upper jacket 108 and the outer upper jacket 112. The one-piece neck tube 118 is configured to allow access to the biological materials stored in the cryogenic dewar. The one-piece neck tube 118 may be approximately 20 inches in length (e.g., 20.0, 20.5, 20.8, 20.11 inches, inclusively), or about 510 millimeters in length (e.g., 509, 509.5, 510.8 millimeters, inclusively). The one-piece neck tube 118 may be other lengths as desired. Further, the one-piece neck tube 118 may be constructed of a composite material. For instance, the one-piece neck tube 118 may be constructed of glass-fiber reinforced epoxy resin. The one-piece neck tube 118 may be constructed of other materials.

Referring now to FIGS. 2A, 2B, 3A, and 3B, the one-piece neck tube 118 includes a first portion 120 and a second portion 122. The first portion 120 is configured to couple with the outer vessel 104. Particularly, the first portion 120 is configured to couple with the outer upper jacket 112. The first portion 120 has a first end 124, a second end 126, and a first diameter D1. The first diameter D1 is an outer diameter of the first portion 120. The first diameter D1 may be approximately 2.5 inches (e.g., 2.48, 2.5, 2.52 inches, inclusively), or about 63.5 millimeters (e.g., 62.9, 64.0 millimeters, inclusively). The one-piece neck tube 118 may be other diameters as desired. The second portion 122 is configured to couple with the inner vessel 102. Particularly, the second portion 122 is configured to couple with the inner upper jacket 108. Further, the second portion 122 extends into the inner vessel 102. The second portion 122 of the one-piece neck tube 118 may extend through the entire length of the inner vessel 102. The second portion 122 has a first end 128, a second end 130, and a second diameter D2. The second diameter D2 is an outer diameter of the second portion 130. The second end 124 of the first portion abuts the first end 128 of the second portion 122 and is integrally formed as one-piece of material with the first end 128 of the second portion 122. The first portion 120 and second portion 122 are one continuous integrally formed one-piece structure. Further, the second diameter D2 is equal to the first diameter D1. Accordingly, the first portion 120 and the second portion 122 define a single neck tube (e.g., the one-piece neck tube 118).

The one-piece neck tube 118 further includes a first sealing section 132 disposed adjacent the first end 124 of the first portion 120. The first sealing section 132 has a third diameter D3 that is larger than the first diameter D1. The third diameter D3 is an outer diameter of the first sealing section 132. The third diameter D3 may be approximately 2.75 inches (e.g., 2.74, 2.76 inches, inclusively), or about 69.9 millimeters (e.g., 69.7, 69.8, 70.2 millimeters, inclusively). For instance, the first sealing section 132 is a thickening of the one-piece neck tube 118. The first sealing section 132 may comprise an annular thickening of the one-piece neck tube 118. Annular thickening may refer to a localized increase in magnitude of an outer diameter of the one-piece neck tube 118. Accordingly, the first sealing section 132 is configured to seal the one-piece neck tube 118 with the outer upper jacket 112. Particularly, the first sealing section 132 is configured to be in confronting relation with the flange 115 of the outer vessel 104.

The one-piece neck tube 118 further includes a second sealing section 134 disposed along the second end 124 of the first section 120. The second end 124 corresponds with the first end 126 of the second portion 122 such that the second sealing section 134 is where the first portion 120 and the second portion 122 meet. The second sealing section 134 has a fourth diameter D4 that is larger than the first diameter D1. The fourth diameter D4 is an outer diameter of the second sealing section 134. The fourth diameter D4 may be equal to the third diameter D3. The fourth diameter D4 may be less than or greater than the third diameter D3. The second sealing section 134 is a thickening of the one-piece neck tube 118. The second sealing section 134 may comprise an annular thickening of the one-piece neck tube 118. Annular thickening may refer to a localized increase in magnitude of an outer diameter of the one-piece neck tube 118. Accordingly, the second sealing section 134 is configured to seal the one-piece neck tube 118 with the inner upper jacket 108. Particularly, the second sealing section 134 is configured to be in confronting relation with the flange 111 of the inner vessel 102.

The one-piece neck tube 118 further includes a perforated area 136. The perforated area 136 is disposed along at least a portion of the second portion 122. The perforated area 136 may comprise a plurality of perforations 138 (e.g., holes, openings, apertures, etc.) along the surface of the second portion 122. For instance, the perforated area 136 may include 48 perforations, wherein the 48 perforations are in an 8×6 configuration. In various embodiments, other suitable amounts and configurations may be included. The second portion 122 of the one-piece neck tube 118 creates a barrier between the liquid nitrogen absorbent and a payload area of the dewar which contains the biological material. The perforated area 136 allows access to the biological material in the payload area of the dewar. The perforated area 136 allows for charging of an absorbent material with liquid nitrogen prior to shipment of the biological material. For instance, the locations of the plurality of perforations 138, along with the single-piece design, will slow the escape of the cryogen in the non-upright-position-dewars during shipment, extending the holding time and viability of the biological samples inside the tank. Particularly, the inner upper jacket 108 entraps cold nitrogen vapor when the dewar is inverted, extending the length of time the payload will remain at cryogenic temperature. The position of the plurality of perforations 138 along the second portion 122 of the one-piece neck tube 118 impacts the volume of cold nitrogen entrapped, wherein the further the perforated area 136 is located from a collar (e.g., disposed around the flange 111) of the inner upper jacket 108, the colder vapor will be entrapped, lengthening the cold temperature holding time. However, if the perforated area 136 is located too far away from the collar of the inner upper jacket 108, the tank will not charge with liquid nitrogen as quickly as if the perforated area 136 is closer to the collar of the inner upper jacket 108.

Referring back to FIGS. 1A and 1B, the dewar 100 includes a collar 140. The final joint between the one-piece neck tube 118 and the outer vessel 104 is the collar 140. The collar 140 is configured to secure the one-piece neck tube 118 to the outer vessel 104. For instance, when positioned, the first sealing section 132 of the one-piece neck tube 118 is disposed within the flange 115 of the outer vessel 104. As such, the collar 140 is then disposed around the flange 115, completed using adhesive or other fastening methods. For instance, the one-piece neck tube 118 may be coupled to the outer upper jacket 112 via an epoxy, magneform/crimping, or a combination thereof. The insulation space between the inner and outer vessels 102, 104 is then evacuated via the valve 106 to complete the thermal isolation of the inner vessel.

Finished dewars are typically boxed and may be shipped individually or on pallets to minimize tumbling during shipment. Some of the cryogenic dewars will spend their service life in stationary conditions, while other models are intended for repeated travel through shipping handlers, for the transport of cold, cryogenic materials, with, as an example only, liquid nitrogen inside the dewar, keeping the transported materials cold. Accordingly, a one-piece neck tube allows continuous concentric alignment through such travel/handling to allow for insertion and removal of the biological material stored in the payload area of the vapor shipper, and the viability of the biological material that may be reduced in extreme misalignment occurrences.

While the preferred embodiments of the disclosure have been shown and described, it will be apparent to those skilled in the art that changes and modifications may be made therein without departing from the spirit of the disclosure, the scope of which is defined by the following claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

What is claimed is:

1. A dewar for storing a cryogenic fluid comprising:
   an inner vessel configured to store the cryogenic fluid;
   an outer vessel including an outer upper jacket and an outer lower jacket, the outer upper jacket including a central region and a collar, the outer upper and lower jackets configured to be joined and define an interior chamber, the inner vessel being positioned within the interior chamber of the outer vessel so that an insulation space is defined between the inner and outer vessels, wherein the insulation space is at least partially evacuated of air; and
   a one-piece neck tube extending between the inner vessel and the central region of the outer upper jacket, the one-piece neck tube comprising:
   a first portion configured to couple with the outer upper jacket, the first portion having a first outer diameter; and
   a second portion configured to couple with the inner vessel such that the second portion extends into the inner vessel, the second portion having a second outer diameter, the second portion integrally formed with the first portion as one-piece,
   wherein the one-piece neck tube comprises a first sealing section disposed on a first end of the first portion, the first sealing section having a third outer diameter that is larger than the first outer diameter such that the first sealing section is configured to seal the one-piece neck tube with the outer upper jacket.

2. The dewar of claim 1, wherein the second portion comprises a perforated area.

3. The dewar of claim 1, wherein the inner vessel includes an inner upper jacket and an inner lower jacket that are joined together.

4. The dewar of claim 3, wherein the one-piece neck tube is configured to extend from the inner lower jacket to the outer upper jacket.

5. The dewar of claim 3, wherein the one-piece neck tube further comprises a second sealing section disposed on a second end of the first portion opposite the first end, the second end corresponding with a first end of the second portion, the second sealing section having a fourth outer diameter that is larger than the first outer diameter such that the second sealing section is configured to seal the one-piece neck tube with the inner upper jacket.

6. The dewar of claim 1, wherein the first outer diameter and the second outer diameter are equal.

7. The dewar of claim 1 wherein the neck is constructed of glass-fiber reinforced epoxy resin.

8. The dewar of claim 1, wherein the outer vessel is constructed of aluminum alloy.

9. A one-piece neck tube of a dewar for storing a cryogenic fluid, the one-piece neck tube comprising:
   a first portion configured to couple with an outer vessel of a dewar, the first portion having a first outer diameter; and
   a second portion configured to couple with an inner vessel of a dewar, the second portion having a second outer diameter equal to the first outer diameter,
   wherein the first portion and the second portion are portions of a same piece of glass-fiber reinforced material, and
   a first sealing section disposed on a first end of the first portion, the first sealing section having a third outer diameter that is larger than the first outer diameter such that the first sealing section is configured to seal the one-piece neck tube with the outer vessel.

10. The one-piece neck tube of claim 9, wherein the second portion comprises a perforated area.

11. The one-piece neck tube of claim 9, wherein the one-piece neck tube is configured to extend from the bottom of the inner vessel to the top of the outer vessel.

12. The one-piece neck tube of claim 9, wherein the one-piece neck tube further comprises a second sealing section disposed on a second end of the first portion opposite the first end, the second end corresponding with a first end of the second portion, the second sealing section having a fourth outer diameter that is larger than the first outer diameter such that the second sealing section is configured to seal the one-piece neck tube with the inner vessel.

13. The one-piece neck tube of claim 9, wherein the first portion and the second portion are configured to provide an only mechanical connection between the outer vessel of the dewar and the inner vessel of the dewar inside the outer vessel of the dewar to support the inner vessel suspended inside an insulation space of the dewar.

14. An outer vessel for a dewar for storing a cryogenic fluid comprising:
   an outer upper jacket;
   an outer lower jacket configured to be joined with the outer upper jacket, the outer upper jacket and the outer lower jacket together defining an interior chamber;

a one-piece neck tube that is adapted to attach to an inner vessel disposed within the interior chamber of the dewar, the one-piece neck tube comprising:
  a first portion coupled with the outer upper jacket; and
  a second portion configured to couple with the inner vessel, wherein the second portion comprises a perforated area,
  wherein the perforated area is configured to be disposed within the inner vessel; and
a collar configured to secure the one-piece neck tube to the outer upper jacket.

15. The outer vessel of claim 14, wherein the first portion includes a first outer diameter and the second portion includes a second outer diameter equal to the first outer diameter, the first outer diameter corresponding with an opening of the outer vessel and the second outer diameter corresponding with an opening of the inner vessel.

16. The outer vessel of claim 15, wherein the collar is configured to surround the opening of the outer vessel.

17. A method of assembly of a dewar for storing a cryogenic fluid, the method comprising:
  coupling an inner upper jacket with an inner lower jacket such that an inner vessel is formed, the inner vessel configured to store a biological material;
  coupling a one-piece neck tube with the inner upper jacket;
  positioning the inner vessel within an outer lower jacket;
  coupling the one-piece neck tube with an outer upper jacket;
  coupling the outer upper jacket with the outer lower jacket such that an outer vessel is formed, the outer vessel configured to contain the inner vessel, wherein the inner vessel and the outer vessel are coupled only by the one-piece neck tube,
  coupling a first portion of the one-piece neck tube with the outer upper jacket, the first portion having a first outer diameter;
  coupling a second portion of the one-piece neck tube with the inner vessel such that the second portion extends into the inner vessel, the second portion having a second outer diameter, the second portion integrally formed with the first portion as one-piece;
  sealing the one-piece neck tube with the outer upper jacket at a first sealing section disposed on a first end of the first portion; and
  sealing the one-piece neck tube with the inner upper jacket at a second sealing section disposed on a second end of the first portion opposite the first end, the second end corresponding with a first end of the second portion, the second sealing section having a fourth outer diameter that is larger than the first outer diameter.

* * * * *